Figure 1:
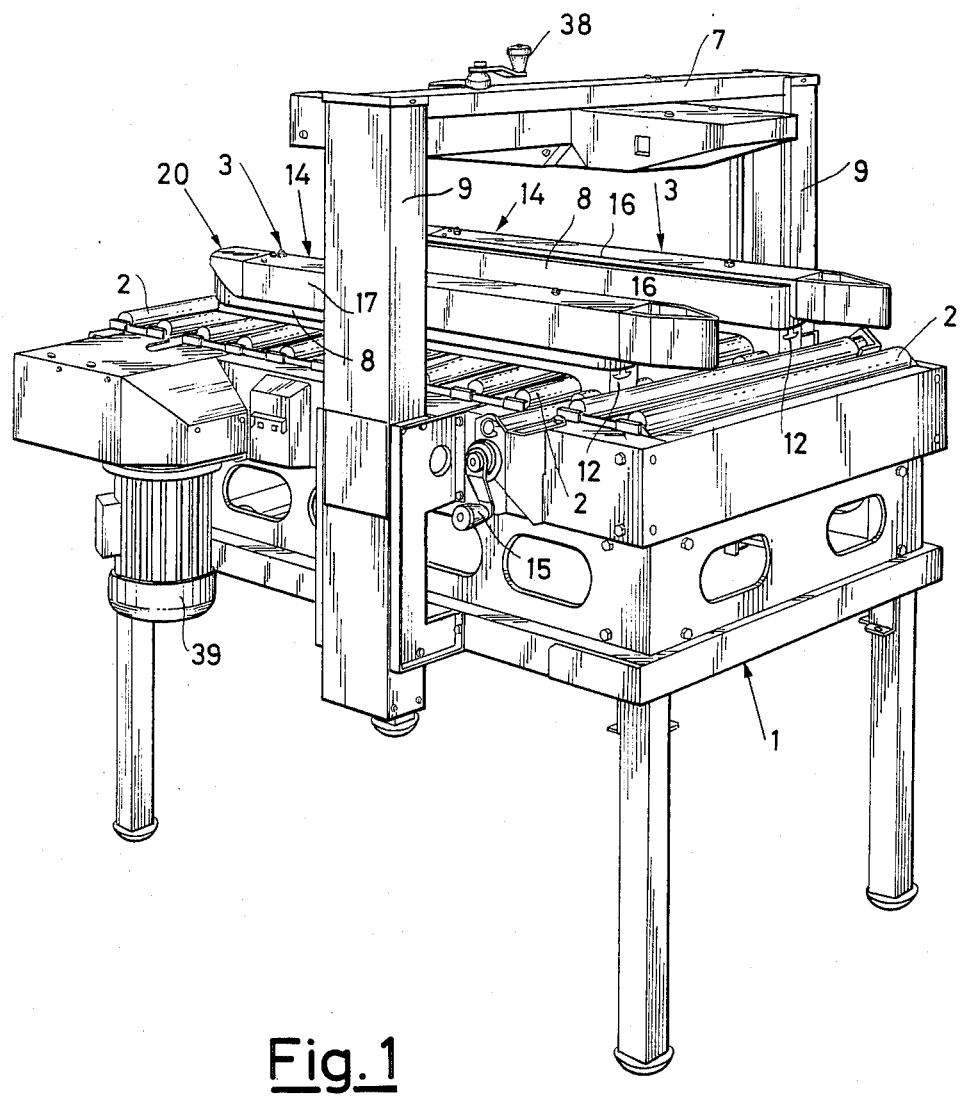

United States Patent [19]

Marchetti

[11] Patent Number: 4,685,269

[45] Date of Patent: Aug. 11, 1987

[54] ACCIDENT PREVENTION DEVICE FOR MOTORIZED-BELT PULLING UNITS FOR CARDBOARD BOX TAPING MACHINES

[76] Inventor: Augusto Marchetti, Piazza Sicilia, 7, 20146 Milano, Italy

[21] Appl. No.: 819,106

[22] Filed: Jan. 15, 1986

[30] Foreign Application Priority Data

Jan. 24, 1985 [IT] Italy .............................. 20590/85[U]

[51] Int. Cl.⁴ ............................................... B65B 7/16
[52] U.S. Cl. .......................................... 53/167; 53/77; 53/137; 198/860.3
[58] Field of Search ................... 53/77, 137, 387, 390, 53/391, 167; 198/860.3, 860.5; 156/468

[56] References Cited

U.S. PATENT DOCUMENTS

| | | | |
|---|---|---|---|
| 4,551,194 | 11/1985 | Marchetti | 53/137 |
| 4,572,760 | 2/1986 | Marchetti | 53/137 |
| 4,585,504 | 4/1982 | Marchetti | 53/137 |

Primary Examiner—Robert L. Spruill
Assistant Examiner—Donald R. Studebaker
Attorney, Agent, or Firm—Cushman, Darby & Cushman

[57] ABSTRACT

A terminal piece fixed to the hood of the belt pulling unit has a front wall with descending oblique lower edge to convey out of the pulling area of the belt any bodies or objects pulled by said belt.

3 Claims, 8 Drawing Figures

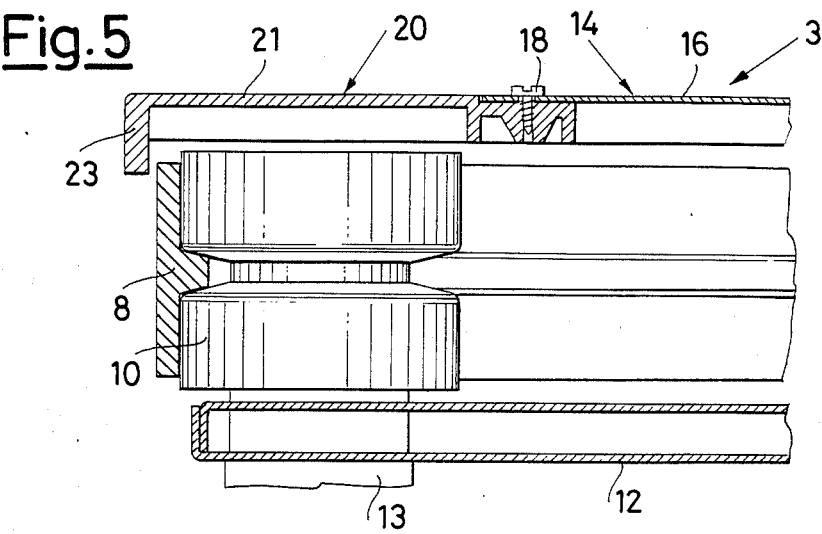
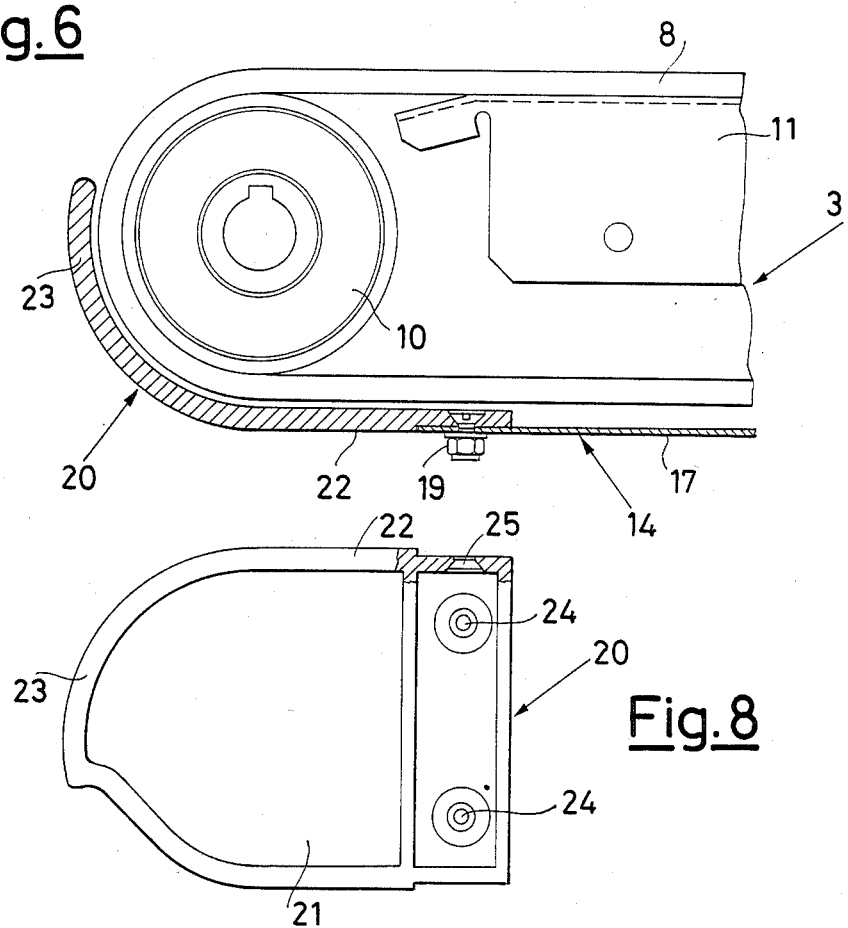

ACCIDENT PREVENTION DEVICE FOR MOTORIZED-BELT PULLING UNITS FOR CARDBOARD BOX TAPING MACHINES

The present invention relates to an accident prevention device for motorized-belt drives for cardboard box taping machines.

Taping machines for cardboard boxes are known in which advance of the boxes along the working surfaces is brought about by a pair of motorized-belt pulling units which engage by friction with the opposing sides of the boxes.

Said pulling units comprise substantially a horizontally developed belt and vertical wall which is stretched in a closed loop between two terminal pulleys mounted in a turning manner on a supporting structure. A metal covering hood is place upon and beside the belt for the entire extension of said belt.

A problem with these pulling units is accident prevention. Safety standards require the employment of adequate measures capable of preventing a body of any kind such as the operator's hand or clothing for example, coming accidentally in contact with the uncovered or forward part of the belt and being dragged thereby inside the hood, when the belt begins its return travel, with clear danger of damage or accident.

For this purpose it is at present provided to give the hood, at the outlet end of the boxes of the two pulling units, a special inclined plane shape capable of conveying any bodies or objects dragged by said belt downward and out of the area of operation of the belt. In practice the hood is made to reach more or less the axis of the outlet pulley and at said end the outer side wall is cut and bent back along an oblique edge which has the aforesaid function. A terminal semidisc made of plastic is normally added to complete the top cover of the belt and the associated outlet pulley.

This known system has the drawback of leaving the belt uncovered just in the area where accidental contact with the belt is more likely to occur. In addition the shape of the metal hood creates some problems of construction and finishing.

The object of the present invention is to make an accidental prevention device for motorized-belt pulling devices which would be free of the aforesaid drawbacks, in particular ensuring for the belts adequate front protection at the outlet ends of the pulling units.

In accordance with the invention said purpose is achieved by a protective device comprising a hood set above and outside the belt from one end to the other of each pulling unit, characterized in that it also comprises at the outlet end of said unit a terminal piece fixed to said hood and consisting of a flat upper wall for top protection of the belt, of a flat side wall for side protection of the belt and of a curved front wall for front protection of the belt, said front wall and said side wall developing downward from said upper wall with progressively decreasing height, substantially starting from the front centre line of the belt in such a manner as to describe a descending oblique lower edge capable of conveying out of the area of operation of the belt any bodies or objects dragged from the uncovered part of the belt.

In other words a terminal piece preferably of plastic added to a normal metal hood with no particular shaping provides front protection for the belt while at the same time ensuring the due expulsion effect of any bodies or objects dragged by the belt. Safety is thus increased together with simplicity of construction.

Figure 2:
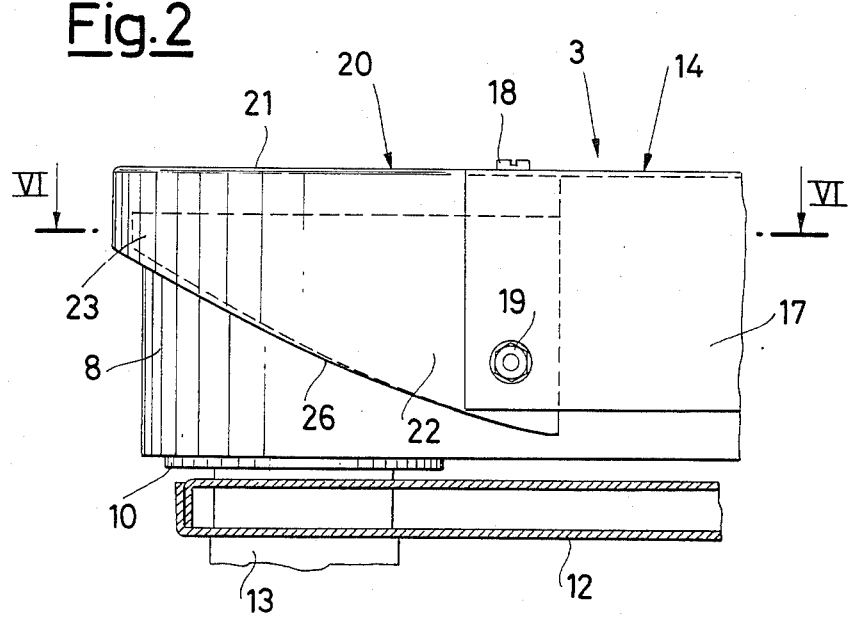
Figure 3:
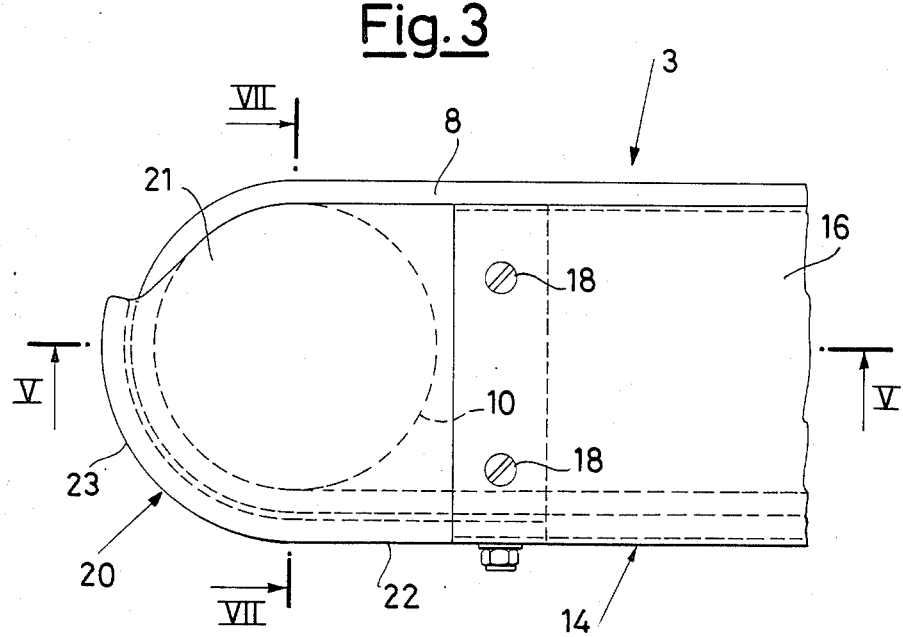
Figure 7:
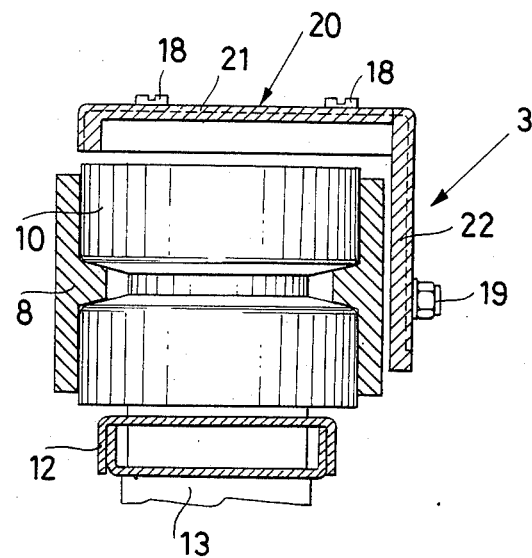
Figure 4:
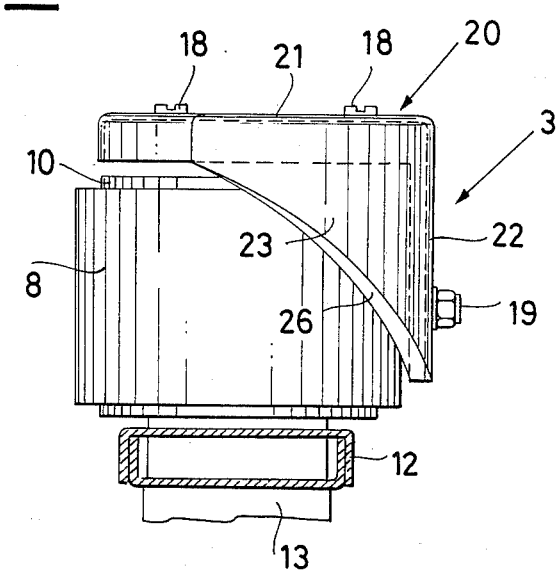

The characteristics of the present invention will be better understood by observing the annexed drawings wherein:

FIG. 1 shows an overall perspective view of a cardboard box taping machine which employs pulling units fitted with a protective device in accordance with the present invention, FIG. 2 shows an enlarged side view of the detail of the outlet end of the boxes of one of the aforesaid pulling units, FIG. 3 shows a top view of said outlet end, FIG. 4 shows a front view of said outlet end, FIG. 5 shows a sectional view of said outlet end along plane of cut V—V of FIG. 3, FIG. 6 shows a sectional view of said outlet end along plane of cut VI—VI of FIG. 2, FIG. 7 shows a sectional view of said outlet end along plane of cut VII—VII of FIG. 3, and FIG. 8 shows a bottom view with respect to FIG. 5 of the detail of the protective terminal piece applied to said outlet end.

The machine shown in the drawings comprises basically a bed 1 which with a set of idling rollers 2 describes a supporting and advancing plane for the boxes to be taped. A pair of belt pulling units 3 is arranged at a distance adjustable by means of a crank 15 along opposing sides of the bench 1 in order to create a pulling engagement with the box sides. An optional lower taping unit not shown may be installed and fixed in a recess in the aforesaid supporting plane to apply lengths of adhesive tape along the bottom of the boxes. An upper taping unit may be attached to a crosspiece 7 placed in an adjustable raised position with respect to the supporting plane of the boxes along fixed support and guide columns 9 to apply lengths of adhesive tape along the top of the boxes. An operating crank 38 makes it possible to vary the position of the crosspiece by means of mechanisms not shown in the drawings.

Each of the two pulling units 3 comprises a conveying belt with vertical walls stretched in a loop between two end pulleys 10 one of which is placed at the box inlet end of the two pulling units, at the right when viewing FIG. 1 and not shown in the drawings, and is idling and the other one of which, placed at the outlet end of said pulling units, at the left when viewing FIG. 1, and shown in FIGS. 2-7, is driven by a motor 39 through an appropriate motion transmission system terminating with a vertical shaft 13 (FIGS. 2-7). The two pulleys 10 of each pulling unit together with the associated belt 8 and with a sliding & containment shoe 11 housed inside the belt are supported in a turning manner by a rigid arm 12 (FIGS. 1, 2, 4, 5 and 7) which extends along the bed 1 and its appropriately shiftable toward and away from the corresponding supporting arm 12 of the other pulling unit by operation of the aforesaid crank 15.

Each of the two pulling units is also fitted with a protective device which comprises a metal hood 14 extending from one end to the other of the belt 8 and formed of a flat upper wall 16 and of a flat side wall 17 arranged respectively as a top cover and outer side protection of the belt 8.

To the hood 14 at the outlet end of the pulling unit is fixed by screws 18 and 19 a terminal piece 20 which has the function of preventing bodies and objects pulled by the uncovered part (inner branch) from falling between the belt and the hood when the belt begins return travel (outer branch).

Said terminal piece 20 is illustrated in detail in FIGS. 2-8 and comprises in a single plastic body a flat upper wall 21 for top protection of the belt 8, a flat side wall 22 for outer side protection of the belt and a curved front wall 23 for front protection of the belt.

The upper wall 21 is provided with holes 24 to receive the fixing screws 18 and the side wall 22 is provided with a hole 25 to receive the fixing screw 19 (FIG. 8).

As shown in FIGS. 2-5 the side wall 22 and the front wall 23 of the terminal piece 20 develop downward from the upper wall 21 with progressively decreasing height, substantially starting from the front centre line of the belt 8 (FIGS. 3 and 4) in such a manner as to describe a descending oblique lower edge 26 capable of conveying out of the belt's operating area any bodies or objects pulled from the uncovered part of the belt.

The desired protection against accidents caused by the pulling effect of the belts within the covering hoods is thus secured.

I claim:

1. Accident protection device for motorized-belt pulling units for cardboard box taping machines comprising a covering hood set over and beside the belt from an inlet end to an outlet end of each pulling unit characterized in that said hood comprises at the outlet end of said unit a terminal piece fixed to said hood and consisting of a flat upper wall for upper protection of the belt, of a flat side wall for outer side protection of the belt, and of a curved front wall for front protection of the belt, said front wall and said side wall developing downward from each upper wall with progressively decreasing height substantially starting from the front center line of the belt in such a manner as to describe a descending oblique lower edge capable of conveying out of the operating area of the belt any bodies or objects pulled by the uncovered part of the belt.

2. Device in accordance with claim 1 characterized in that said terminal piece is made in a single body of plastic material.

3. An accident protection device for a motorized belt pulling unit for a cardboard box taping machine, the unit having an inlet end and an outlet end defined by horizontally spaced-apart vertical pulleys and an endless belt carried by said pulleys, said protection device comprising: a metal hood extending longitudinally of said belt and having a flat upper wall and a flat vertical side wall, said side wall being spaced from and parallel to one run of the belt, said upper wall and side wall terminating at the outlet end of the unit in straight edges which lie in a vertical plane located approximately at the periphery of the respective pulley facing the other pulley; and a one-piece terminal member constructed of plastic material having a flat upper wall substantially coplanar with the upper wall of said hood and overlying said respective pulley, a flat side wall substantially coplanar with the side wall of said hood and a curved front wall covering an upper portion of the belt, said front wall merging with the upper wall and side wall of said terminal member, said front wall and said side wall of said member developing downward from said upper wall of said member with progressively decreasing height substantially starting from the front center line of the belt in such a manner as to describe a descending oblique lower edge capable of conveying out of the operating area of the belt any bodies or objects pulled by the uncovered part of the belt, and connecting means attaching the side wall of said member to the side wall of said hood and attaching the upper wall of said member to the upper wall of said hood.

* * * * *